US010686344B2

(12) United States Patent
Csoti et al.

(10) Patent No.: US 10,686,344 B2
(45) Date of Patent: Jun. 16, 2020

(54) INTERCONNECTION BOARD OF A STATOR FOR AN ELECTRICAL MACHINE AND METHOD FOR PRODUCING SAME

(71) Applicant: Robert Bosch GmbH, Stuttgart (DE)

(72) Inventors: Tamas Csoti, Kisszallas (HU); Konstantin Haberkorn, Stuttgart (DE)

(73) Assignee: Robert Bosch GmbH, Stuttgart (DE)

( * ) Notice: Subject to any disclaimer, the term of this patent is extended or adjusted under 35 U.S.C. 154(b) by 324 days.

(21) Appl. No.: 15/542,139

(22) PCT Filed: Dec. 28, 2015

(86) PCT No.: PCT/EP2015/081264
§ 371 (c)(1),
(2) Date: Jul. 7, 2017

(87) PCT Pub. No.: WO2016/110425
PCT Pub. Date: Jul. 14, 2016

(65) Prior Publication Data
US 2018/0262075 A1 Sep. 13, 2018

(30) Foreign Application Priority Data
Jan. 7, 2015 (DE) .......................... 10 2015 200 093

(51) Int. Cl.
*H02K 11/00* (2016.01)
*H02K 3/50* (2006.01)
(Continued)

(52) U.S. Cl.
CPC ............... *H02K 3/50* (2013.01); *H02K 3/522* (2013.01); *H02K 5/225* (2013.01);
(Continued)

(58) Field of Classification Search
CPC ........................................................ H02K 3/50
(Continued)

(56) References Cited

U.S. PATENT DOCUMENTS 8,729,755 B2 * 5/2014 Nakagawa ............. H02K 3/522
310/68 R
9,866,084 B2 * 1/2018 Hashimoto ............ H02K 3/522
(Continued)

FOREIGN PATENT DOCUMENTS

CN 201533207 U 7/2010
DE 19842170 3/2000
(Continued)

OTHER PUBLICATIONS

International Search Report for Application No. PCT/EP2015/081264 dated Apr. 14, 2016 (English Translation, 3 pages).

*Primary Examiner* — Alexander Talpalatski
(74) *Attorney, Agent, or Firm* — Michael Best & Friedrich LLP

(57) ABSTRACT

An interconnection board (52) of a stator (10) of an electrical machine (12), as well as a method for producing same, by means of which an electrical winding (16) of the stator (10) can be connected to customer-specific connecting plugs (56) for power supply, wherein the interconnection board (52) has a closed ring (61) as a plastic body (62), onto which closed ring (61) exactly three holding elements (63) are integrally formed, extending in the axial direction (3), in which holding elements respective axial connector plugs (54) made of metal extend in the axial direction, wherein the axial connector plugs (54) are each integrally configured with conductive elements (58) which can be directly electrically connected to connecting wires (30, 31) of the electrical winding (16).

25 Claims, 5 Drawing Sheets

(51) Int. Cl.
*H02K 15/00* (2006.01)
*H02K 3/52* (2006.01)
*H02K 5/22* (2006.01)

(52) U.S. Cl.
CPC ..... *H02K 15/0068* (2013.01); *H02K 15/0075* (2013.01); *H02K 2203/09* (2013.01)

(58) Field of Classification Search
USPC .......................................................... 310/71
See application file for complete search history.

(56) References Cited

U.S. PATENT DOCUMENTS

| | | | |
|---|---|---|---|
| 2004/0183386 A1* | 9/2004 | Kuwert | H02K 3/50 310/89 |
| 2005/0088049 A1 | 4/2005 | De Filippis et al. | |
| 2011/0057524 A1 | 3/2011 | Andrieux et al. | |
| 2011/0175471 A1 | 7/2011 | Marchitto et al. | |
| 2012/0126646 A1* | 5/2012 | Nakagawa | H02K 3/522 310/71 |
| 2012/0286604 A1* | 11/2012 | Abe | H02K 11/33 310/71 |
| 2013/0015737 A1 | 1/2013 | Helmi | |
| 2013/0187513 A1* | 7/2013 | Hashimoto | H02K 3/522 310/215 |
| 2015/0295371 A1* | 10/2015 | Houzumi | H02K 3/522 310/71 |

FOREIGN PATENT DOCUMENTS

| | | |
|---|---|---|
| DE | 102010000710 | 7/2011 |
| DE | 102011008386 | 7/2011 |
| DE | 102012202131 | 8/2013 |
| DE | 102013003024 | 8/2014 |
| EP | 1526628 | 4/2005 |
| EP | 1783880 | 5/2007 |
| JP | H10336936 A | 12/1998 |
| WO | 2011082879 | 7/2011 |

* cited by examiner

INTERCONNECTION BOARD OF A STATOR FOR AN ELECTRICAL MACHINE AND METHOD FOR PRODUCING SAME

BACKGROUND OF THE INVENTION

The invention relates to an interconnect plate of a stator for an electric machine, and to an electric machine, and to a method for producing an interconnect plate.

DE 10 2010 000 710 A1 has disclosed a bearing bracket of an electric machine, which simultaneously serves as an interconnect plate for the electrical winding of a stator. Here, the electrical winding is in the form of a single-tooth winding, in the case of which separately manufactured stator segments are individually enwound and subsequently assembled to form a ring-shaped stator. Here, each single-tooth winding has its own winding wire start and end, which are led axially through holes in the bearing bracket. Said wire starts and ends are welded to conductor elements in order that the individual phases can be fed with current via terminal plugs.

In this embodiment, the conductor elements are highly complex to produce and install. By means of the solution according to the invention, it is sought to provide an interconnect plate in which the terminal plugs are securely guided during the connection thereof to customer-specific plugs, wherein it should be possible for the interconnect plate to be installed independently of the bearing shield.

SUMMARY OF THE INVENTION

The apparatus according to the invention and the method according to the invention have the advantage in relation to this that, by means of the embodiment of the holding elements for the terminal plugs as axial projections integrally formed on the plastics plate in unipartite fashion, the terminal plugs are supported very reliably in all spatial directions during the plugging-on of the connecting plugs. Here, both the plastics body of the interconnect plate and the conductor elements fastened thereto with their integrated terminal plugs can be produced and installed very easily and inexpensively.

The conductor elements are advantageously punched out of a metal sheet, wherein the terminal plugs are bent so as to extend in the axial direction of the rotor shaft. Here, the planar metal sheet of the terminal plugs extends transversely with respect to the circumferential direction, whereas the remainder of the angled conductor elements extends areally in a plane transverse with respect to the rotor shaft in the circumferential direction. In this embodiment, the central parts of the conductor elements can be very easily supported axially on the ring-shaped plastics body of the interconnect plate, wherein the axially angled terminal plugs are simultaneously supported in the axially extending holding elements. Here, the conductor elements are preferably fastened to the plastics body by means of plastic material deformation of said plastics body. Since the terminal plugs are formed as sheet-metal lugs of the bent and punched part, they can easily form an insulation-displacement connection with the corresponding connecting plugs.

Since the flat terminal plugs extend in the radial and axial directions, they are supported in a particularly expedient manner by guide surfaces of the holding elements which likewise extend in the radial direction and axial direction.

In a preferred embodiment, the terminal plugs have transverse webs which extend with the sheet metal of the terminal plugs in the radial direction.

If an axial force is now exerted on the terminal plug during the plugging-on of the connecting plugs, said force can be accommodated by axial stop surfaces of the holding elements. In this way, during the installation of the conductor elements, a clearly defined reference point in the axial direction for the plug-type connection can be provided at all times, regardless of the tolerances.

For the installation of the conductor elements into the holding elements, the latter have slots in the axial direction, which slots are at least as wide in the radial direction as the central regions of the conductor elements. In this way, the conductor elements with the angled terminal plugs can be inserted axially into the holding elements such that the angled central region of the conductor element can extend out through the slot in the circumferential direction.

In one embodiment of the interconnect plate, a total of exactly three axial projections are formed as holding element, wherein in each case two adjacent terminal plugs are inserted into each of the holding elements, such that, with a total of six terminal plugs, six different phases of the electric motor can be actuated. For supporting the two terminal plugs, the holding element has a central web which extends areally in the radial direction and axial direction. In each case one terminal plug can bear against said central web at its outer surfaces situated opposite in the circumferential direction. To support the terminal plugs in each case in both circumferential directions, counterpart surfaces are formed which are spaced apart approximately parallel to the guide surfaces of the central web, on which counterpart surfaces the terminal plugs—or in particular the transverse webs thereof—are supported in the circumferential direction.

In an alternative embodiment of the interconnect plate, in the case of which always in each case only one terminal plug is inserted in an axial holding element, it is advantageously possible for two branches of the conductor element to extend in the two opposite circumferential directions. In this way, the variety of parts and installation outlay can be reduced. The two branches of the conductor elements are advantageously arranged adjacent to one another with respect to the radial direction but in different planes in the axial direction, in order that said branches do not make contact. In this way, additional insulation can be dispensed with. To connect the conductor elements to the connecting wires, situated radially at the outside, of the sub-coils, the conductor elements—or each branch of the conductor element—have/has fastening sections. The fastening section is advantageously formed in unipartite fashion with the bent and punched part, wherein the fastening section of the inner branch crosses the outer branch of the other conductor element with an axial spacing.

In order that the angled portions in the two opposite branches can be inserted axially into the holding elements, the two first and second guide surfaces, which are spaced apart in the circumferential direction, of said angled portions are formed such that said surfaces do not overlap with respect to the radial direction. In this way, the two branches can be bent through approximately 90°, in each case in opposite directions, from one sheet-metal element of the terminal plug, and can thus be inserted axially into the guide slots of the holding elements.

To provide a rotation prevention means for a bearing cover which is installed axially onto the interconnect plate, and axial projection of a single holding element has a different cross section than the two other holding elements. For example, one holding element can be of relatively wide form in the circumferential direction, wherein then, a single axial aperture in the bearing shield is also of correspondingly relatively wide form.

In terms of injection molding, the relatively wide holding element can be realized particularly expediently through the formation of a two-part holding element. Here, the two axial projections each have a U-shaped cross section, such that the free limbs point toward one another in the circumferential direction. Here, the face sides of the free limbs advantageously form the corresponding first and second guide surfaces which are arranged spaced apart in the circumferential direction such that the terminal plug can be inserted, or clamped, in between.

To exactly define the axial position of the terminal plugs, the interconnect plate is supported directly on the stator body by means of spacers. Since the insulating mask with the guide elements for the connecting wires is still arranged between the interconnect plate and the stator body, tolerance deviations of said insulating lamination are thus eliminated. The spacers are advantageously likewise formed in unipartite fashion with the plastics body of the interconnect plate, preferably as an injection-molded part. Here, the spacers advantageously extend axially with respect to the holding elements at the radially outermost region thereof, whereby bending of the interconnect plate in the region of the terminal plugs during the insertion of the connecting plugs is prevented.

For the fastening of the conductor elements to the interconnect plate, rivet pins are integrally formed in the axial direction in unipartite fashion on the plastics body of said interconnect plate, which rivet pins are thermally deformed after the mounting of the conductor elements onto the plastics body. Here, the conductor elements particularly expediently have holes in the metal sheet, through which holes the rivet pin projects, with a rivet connection subsequently being formed.

The stator according to the invention particularly expediently has an interconnect plate, in the case of which the unipartite conductor elements, which are formed as bent and punched parts, electrically connect in each case two radially opposite sub-coil pairs to one another, wherein each terminal plug can be actuated as one phase by the control unit. Here, the conductor element can advantageously be punched out of a metal sheet without much waste, because in the initial state, both branches extend approximately parallel to one another in a plane with the terminal plug. It is only in a second step that the two branches are bent through approximately 90° in opposite directions relative to the metal sheet of the terminal plug in order to form an approximately semicircular conductor element, at the center of which the terminal plug extends axially.

In the case of the electric machine according to the invention, the stator is enwound such that two immediately adjacent stator teeth are enwound with in each case exactly one sub-coil, which sub-coils form a sub-coil pair by means of a continuously wound winding wire. The connecting wire of said immediately adjacently arranged sub-coils is led in the same axial plane of the insulating lamination for all sub-coil pairs. In the case of a twelve-toothed stator, it is thus possible, for example, for six sub-coil pairs with in each case six short connecting wires to be formed, wherein said six short connecting wires in each case form the interface to the fastening sections of the conductor elements. In this way, it is easily selectively possible for six separate phases with in each case one sub-coil pair or only three phases with in each case two electrically interconnected sub-coil pairs to be formed. It is correspondingly possible for three terminal plugs for three phases, or six terminal plugs for six phases, to be formed in the axial direction in the interconnect plate.

In the production method according to the invention of the interconnect plate, the three unipartite conductor elements can firstly be arranged, by means of an auxiliary apparatus, so as to form a ring such that the fastening sections thereof cross one another radially. Then, using an auxiliary tool, all three conductor elements can be simultaneously installed axially onto the plastics body, wherein the terminal plugs are inserted axially in each case into the guide slots of the axial projections of the holding elements. This avoids a situation in which the conductor elements still have to be bent over in the radial direction after the axial installation thereof.

BRIEF DESCRIPTION OF THE DRAWINGS

Exemplary embodiments of the invention are illustrated in the drawings and discussed in more detail in the following description. In the drawings:

FIG. 3, FIGS. 5 and 6 show an exemplary embodiment as per FIG. 3 with a first embodiment of a mounted interconnect plate.

DETAILED DESCRIPTION

Figure 1:
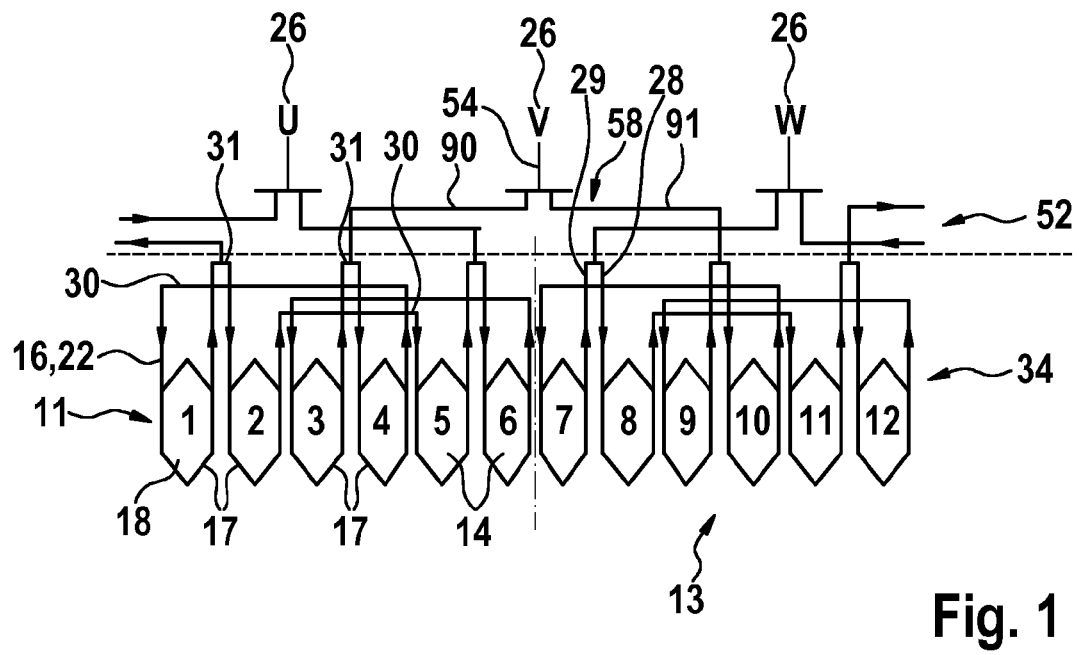
FIG. 1 schematically shows a winding diagram according to the invention.
Figure 2:
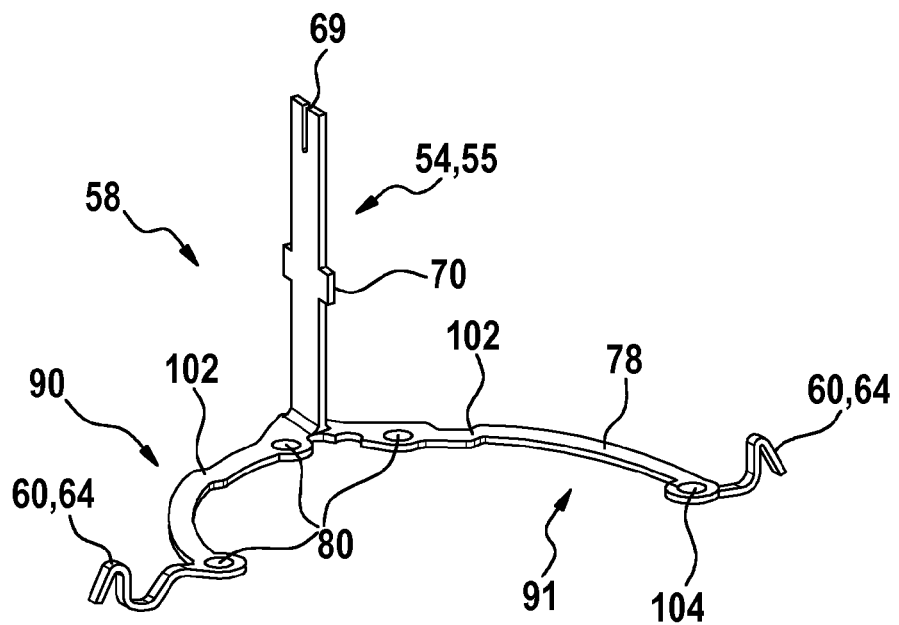
FIG. 2 shows a conductor element according to the invention of an interconnect plate.

FIG. 1 schematically illustrates a cut-open stator 10, on the stator teeth 14 of which the winding diagram of an electrical winding 16 is illustrated. The stator 10 has for example twelve stator teeth 14, wherein in each case always exactly one sub-coil 18 is wound onto each stator tooth 14. Here, in each case two sub-coils 18 situated immediately adjacent to one another are connected by means of a short connecting wire 31 to form an adjacent sub-coil pair 17. The winding is commenced for example with a first wire start 28 on the second stator tooth 14, and a connecting wire 30 is led to the fifth stator tooth 14. Immediately after the fifth stator tooth 14, the sixth stator tooth 14 is wound, such that said sub-coil pair 17 is connected by means of the short connecting wire 31 of two immediately adjacent sub-coils 18. After the sixth stator tooth 14, the winding wire 22 is led by means of the connecting wire 30 to the third stator tooth 14, in order there to form a sub-coil pair 17, which is connected by means of the connecting wire 31, with the fourth stator tooth 14. From the fourth stator tooth 14, the winding wire 22 is led via the connecting wire 30 to the first stator tooth 14, where the wire end 29 of the first winding strand 24 is arranged immediately adjacent to the wire start 28. The second winding strand 25 is wound with a second, separate winding wire 22 correspondingly to the winding of the first winding strand 24, such that a further three sub-coil pairs 17 of immediately adjacently arranged sub-coils 18 are formed, which are connected by means of a short connecting wire 31. The wire start 28 and the wire end 29 of the two winding strands 24, 25 are in each case electrically connected to one another. In this embodiment, after the winding, it is always the case that two coil pairs 17 are connected to form a phase 26, such that a total of exactly three phases U, V, W with in each case four sub-coils are formed. The first three sub-coil pairs 17 form an independent winding strand 24 which is wound from a separate winding wire 22 and which is insulated with respect to the second winding strand 25, which likewise has three sub-coil pairs 17 (as is illustrated by means of the dash-dotted line between the sixth and seventh stator teeth 14). With such a winding, it would thus be possible for six separate phases 26 to be actuated. In our embodiment, however, two radially exactly oppositely situated sub-coil pairs 17 composed of different winding strands 24, 25 are electrically connected to one another by means of conductor elements 58 of an interconnect plate 52 in order to reduce the electronic complexity of the control unit. A conductor element 58 of said type, which is used for example for the actuation of the V phase in FIG. 1, is illustrated in FIG. 2 and will be discussed in more detail in the second embodiment.

Figure 3:
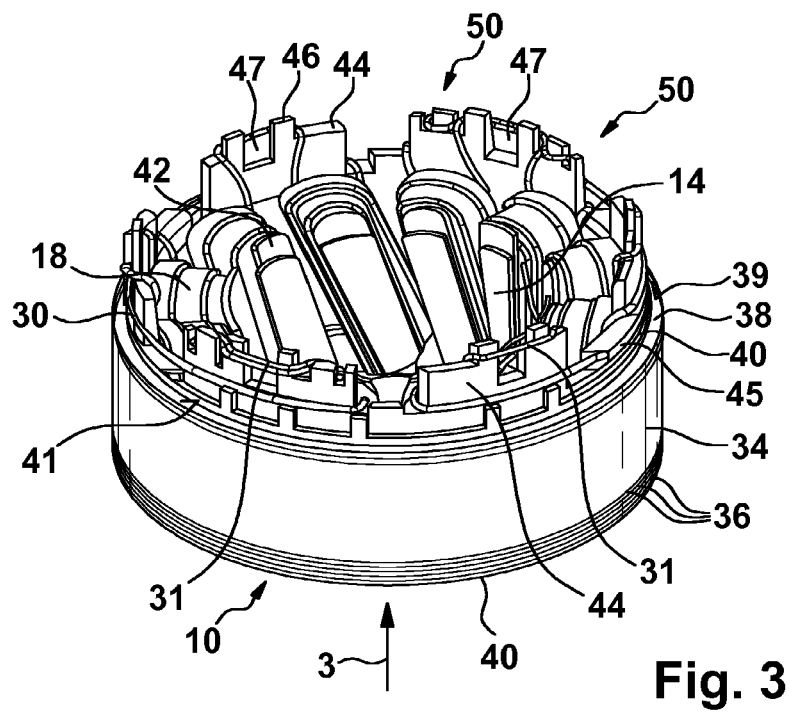
FIG. 3 shows a first exemplary embodiment of a wound stator with insulating lamination.

FIG. 3 now shows a three-dimensional view of a stator 14 which has been wound correspondingly to the winding diagram from FIG. 1. The stator 14 has a stator body 34 which is for example assembled from individual sheet-metal laminations 36. Here, the stator body 34 comprises a ring-shaped closed return yoke 38 on which the stator teeth 14 are radially inwardly integrally formed. In the interior, the stator 14 has a circular cutout into which a rotor (not illustrated) can be inserted, as can be seen more clearly in FIG. 4. The stator teeth 14 extend inward in a radial direction 4 and along the rotor axis in an axial direction 3. In the exemplary embodiment, the stator teeth 14 are formed so as to be skewed in the circumferential direction 2 in order to reduce the detent torque of the rotor. For this purpose, it is for example the case that the sheet-metal laminations 36 are correspondingly rotationally offset with respect to one another in the circumferential direction 2. Before the stator body 34 is enwound, insulating lamination 40 are mounted onto the two axial face sides 39 in order to electrically insulate the winding wire 22 with respect to the stator body 34. At least one of the two insulating laminations 40 has a ring-shaped closed circumference 41, from which insulating teeth 42 extend in the radial direction 4, which insulating teeth cover the face sides 39 of the stator teeth 14. On the ring-shaped circumference 41 of the insulating laminations 40, there are formed guide elements 44 in which the connecting wires 30, 31 are layered between the sub-coils 18. For this purpose, it is for example the case that grooves 45 in the circumferential direction 2 are formed on the circumference 41, such that the connecting wires 30, 31 are arranged in axially offset planes in order to prevent the connecting wires 30, 31 from crossing over. The short connecting wires 31 between the sub-coil pairs 17 are arranged in the uppermost axial plane, wherein in particular, all six connecting wires 31 for the contacting of the phase terminals all run in the same axial plane. For this purpose, two axial projections 46 are always formed between two sub-coils 18 of a sub-coil pair 17, which projections are separated from one another by an interposed radial aperture 47. Thus, the short connecting wires 31 of the sub-coil pairs 17 are freely accessible from all sides and, in particular in the region of the radial aperture 47, do not bear against the insulating lamination 40. The two wire starts 28 and wire ends 29 are, in this exemplary embodiment, fixed in a labyrinth arrangement 50, which labyrinth arrangements are each arranged immediately adjacent, in the circumferential direction 2, to the two axial projections 46 which are spaced apart by the radial aperture 47. It can thus be seen in FIG. 3 that the wire start 28 of the first winding strand 24 runs, over the circumferential region of the radial aperture 47, parallel and immediately adjacent to the wire end 29 of the first winding strand 24. Here, the wire start 28 is arranged in a first labyrinth arrangement 50 on one side of the radial aperture 47, and the wire end 29 of the first winding strand 24 is arranged in a second labyrinth arrangement 50 opposite the radial aperture 47 in the circumferential direction 2. By means of this parallel arrangement of the short connecting wires 31, these can be electrically contacted in the same way as the connecting wires 31 of the continuously wound sub-coil pairs 17 for the purposes of the phase actuation.

Figure 4:
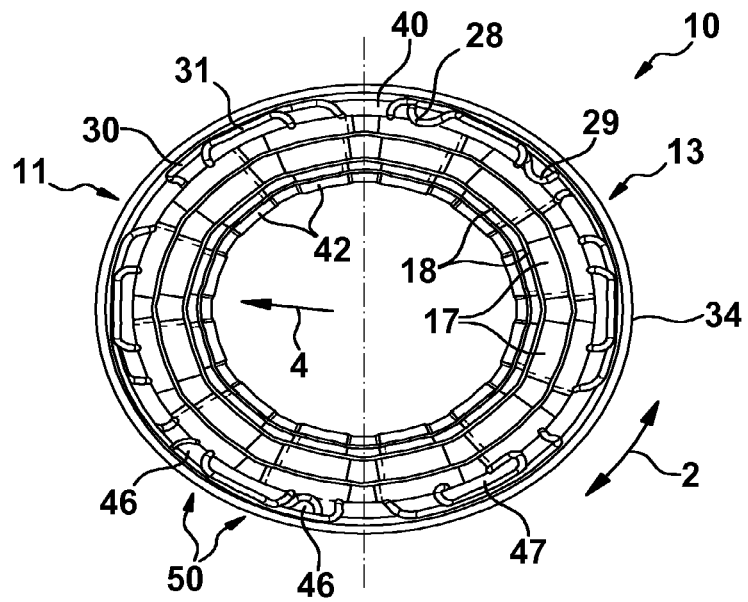
FIG. 4 shows a corresponding plan view as per

In FIG. 4, it can likewise be clearly seen that the two connecting wires 31 running parallel are arranged at the same radius. The free ends of the wire start 28 and of the wire end 29 end directly after the corresponding labyrinth arrangements 50, such that they do not protrude radially beyond the connecting wires 30, 31. The connecting wires 30, 31 all run in the circumferential direction 2 along the guide elements 44 and lie radially outside the sub-coils 18 wound onto the stator teeth 14. In FIG. 4, the two motor halves 11, 13 are likewise schematically separated by the dash-dotted line, wherein the left-hand motor half 11 is electrically insulated with respect to the right-hand motor half 13. The electrical winding 16 is manufactured for example by means of needle winding, wherein the connecting wires 30, 31 can, by means of a winding head, be led radially outward between the sub-coils 18 and laid in the guide elements 44. In this embodiment, all connecting wires 30, 31 are arranged axially on one side of the stator body 34. In an alternative embodiment which is not illustrated, it is also possible for a part of the connecting wires 30, 31 to be laid onto the axially opposite side of the stator 14. Here, it is for example possible for the short connecting wires 31 for the contacting of the phase actuation to be arranged in a first insulating lamination 40, and for the other connecting wires 30, which connect the different sub-coil pairs 17 to one another in each case, to be led on the axially oppositely arranged insulating lamination 40.

Figure 5:
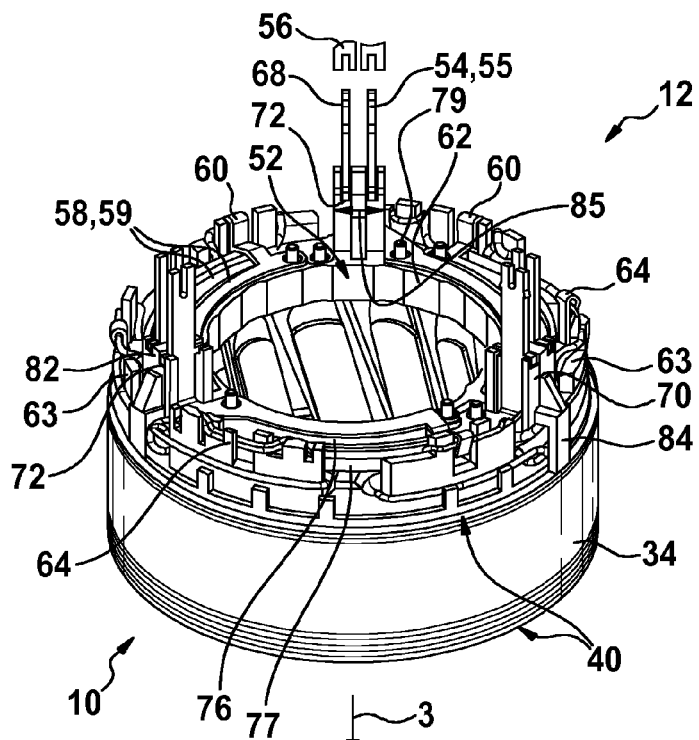

In FIG. 5, a first embodiment of an interconnect plate 52 has been mounted onto the embodiment of the stator 10 as per FIG. 3, by means of which interconnect plate the electrical winding 16 is actuated. For this purpose, the interconnect plate 52 has a terminal plug 54 to which the customer-specific connecting plug 56 of a control unit can be joined. In this embodiment, exactly six terminal plugs 54 are provided, which are in each case electrically connected to one sub-coil pair 17 of the electrical winding 16. Here, exactly six phases 26 are formed by in each case exactly one sub-coil pair 17, such that the six terminal plugs 54 are contacted with exactly six connecting wires 31 of adjacent sub-coil pairs 17. For this purpose, the interconnect plate 52 has exactly six conductor elements 58 which, on an axially angled end, have the terminal plugs 54, and on the other end, have a fastening section 60 which is electrically connected, for example welded, to the connecting wires 31. The interconnect plate 52 has a plastic body 62 which is formed as a closed ring 61 through which the rotor can be inserted into the stator 10. On the plastic body 62 there are integrally formed in unipartite fashion holding elements 63 which extend away from the stator body 34 in the axial direction 3. The conductor elements 58 extend in the circumferential direction 2 along the plastics body 62, wherein the angled terminal plugs 54 are led in the axial direction 3 within the holding elements 63. On the other end, the conductor elements 58 have the fastening section 60, the free end of which is formed as a loop 64 which surrounds the connecting wires 31. Here, the loop 64 is formed from a sheet-metal material, the cross section of which is approximately rectangular. In the exemplary embodiment, the conductor elements 58 are formed as bent and punched parts 59 composed of sheet metal, such that the loop 64 can be bent out of the free end of the fastening section 60, during the installation thereof, around the connecting wire 31. After the arrangement of the open loop 64 around the connecting wire 31, it is for example the case that electrodes are laid onto both radially oppositely situated surfaces of the loop 64, which electrodes are pressed together in the radial direction while being fed with current in order to weld the loop 64 to the connecting wire 31. Here, the insulating lacquer of the connecting wire 31 is melted, resulting in metallic fixed connection between the fastening section 60 and the connecting wire 31. The loop 64 is laid around the connecting wire 31 in the region of the radial aperture 47, because in this region, no guide element 44 is arranged between the connecting wire 31 and the loop 64. As a result, sufficient free space is available for the electrodes to be laid on, such that a free limb end 65 of the loop 64 can be pressed against the fastening section 60, whereby the loop 64 is closed. Here, depending on the sub-coil pair 17, the loop 64 surrounds only a single connecting wire 31 or simultaneously surrounds two connecting wires 31 which run parallel to one another and which are formed from the wire start 28 and the wire end 29 of a single winding strand 24, 25. The terminal plugs 54 are for example formed as insulation-displacement connections 55 which, at their free axial end 68, have a notch 69 into which a wire or a clamping element of the corresponding connecting plug 56 of the customer can be inserted. Furthermore, a transverse web 70 is formed in the radial direction 4 on the terminal plug 54, which transverse web is correspondingly supported on an axial stop 72 of the holding element 63. Furthermore, on the holding element 63, a first guide surface 74 and a second guide surface 75 are formed which support the terminal plug 54 in the two opposite circumferential directions 2. This prevents the terminal plug 54 from bending over or bending out in the circumferential direction 2 during the insertion of the connecting plug 56, whereby the axial tolerances of the plug connection are ensured.

The conductor elements 58 are arranged at least partially radially adjacent to one another, whereby it is necessary for the fastening sections 60 of the inner conductor elements 58 to radially cross the outer conductor elements 58 in order to be contacted with the connecting wires 31. Therefore, the radially inner conductor elements 58 are arranged on an axially higher path 76 of the plastics body 62, and the radially outer conductor elements 58 are arranged on an axially lower-lying path 77. Here, the central sections 78, which are in the form of sheet-metal strips, of the conductor elements 58 bear areally against the plastics body 62 and are connected to the latter for example by means of rivet connections or detent elements. For this purpose, it is for example the case that axial rivet pins 79 are formed on the plastics body 62, which rivet pins engage through corresponding axial apertures 80 of the conductor elements 58. By means of heat, in particular ultrasound, the ends of the rivet pins 79 can be deformed to form a rivet head 81, which forms a form fit with the conductor elements 58.

Figure 6:
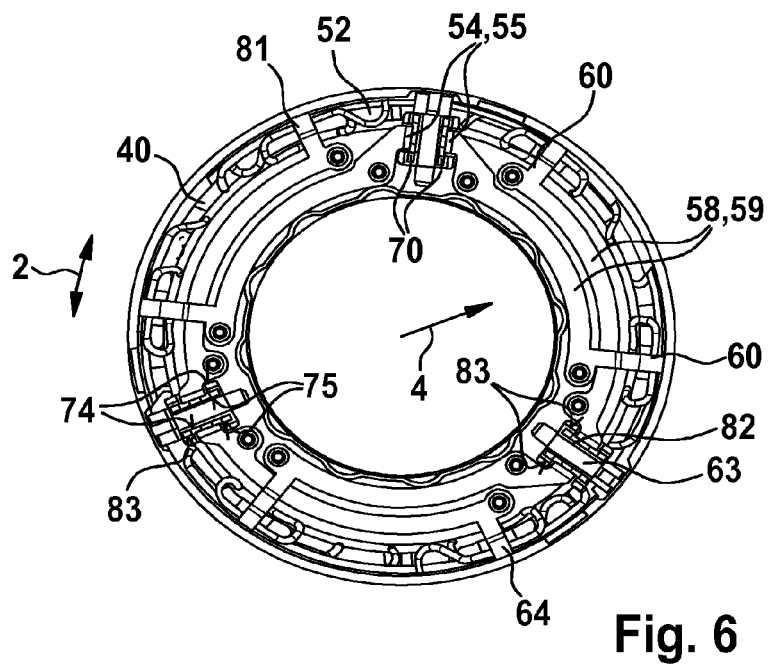

In the exemplary embodiment of FIGS. 5 and 6, it is always the case that two terminal plugs 54 are arranged in a common holding element 63, wherein said terminal plugs are separated from one another in the circumferential direction 2 by a central web 82 of the holding element 63. Here, the central web 82 forms, on both sides, in each case a first and second guide surface 74, 75 for the respectively abutting terminal plug 54. The second and first guide surfaces 75, 74 situated in each case opposite the central web 82 are formed by corresponding counterpart surfaces 83 which extend in the radial direction 4 and axial direction 3. In the region of the holding elements 63—axially opposite these—there are integrally formed elements spacers 84 which support the interconnect plate 52 axially with respect to the stator body 34. In the exemplary embodiment of FIGS. 5 and 6, exactly one holding element 63 has a greater width 85 in the circumferential direction 2 than the two other holding elements 63. In this way, a rotation prevention means is realized for a bearing cover (not illustrated) which is joined axially with correspondingly shaped axial openings onto the holding elements 63.

FIG. 6 shows how the two terminal plugs 54 bear at both sides against the central web 82. Angled in each case in opposite circumferential directions 2, the respective central sections 78 of the conductor elements 58 are situated adjacent one another. Since the conductor elements 58 situated radially adjacent to one another are arranged on axially different paths 76, 77, these conductor elements do not make contact, such that they are electrically insulated with respect to one another. The inner ring of the plastics body 62 is of slightly undulating form in order that a punch tool can be engaged on the inner ends of the stator teeth 14, directly on the side surfaces thereof. In this way, the stator 10 can be pressed into a motor housing (not illustrated).

Figure 7:
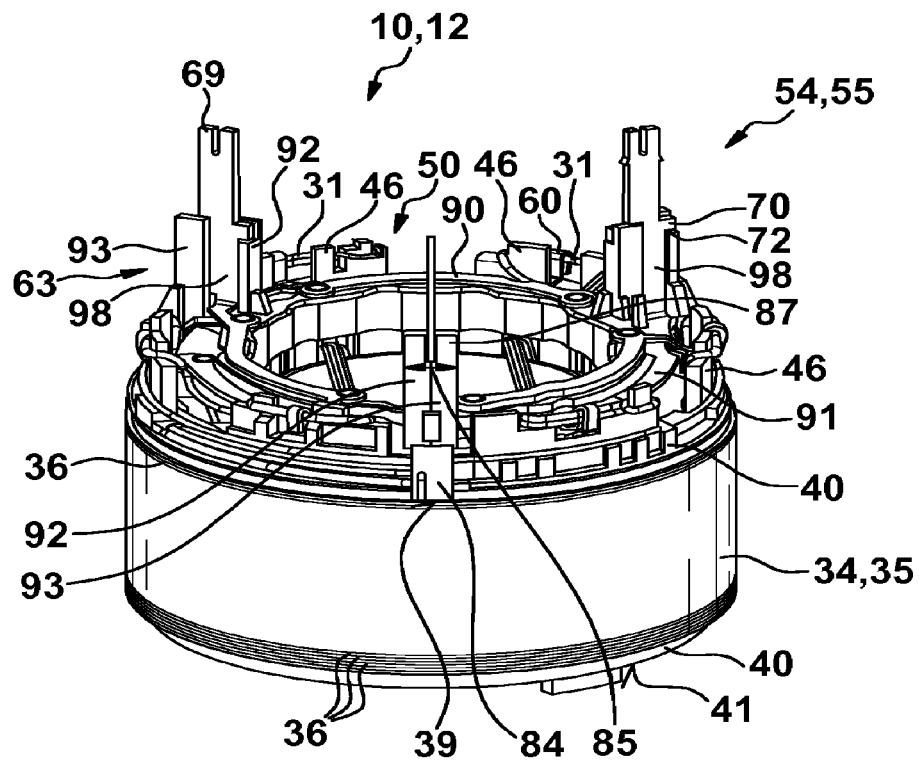
FIGS. 7 and 8 show an exemplary embodiment as per FIG. 3 with a second embodiment of a mounted interconnect plate.

In FIG. 7, as a further exemplary embodiment, an alternative interconnect plate 52 by means of which the electrical winding 16 is actuated has been mounted onto the embodiment of the stator 10 as per FIG. 3. This embodiment corresponds to the actuation with exactly three phases U, V, W according to the schematic illustration in FIG. 1. In this embodiment, the interconnect plate 52 has exactly three terminal plugs 54 onto which customer-specific connecting plugs 56 of a control unit can be joined. Each terminal plug 54 is a constituent part of a conductor element 58 which electrically connects a first sub-coil pair 17 to a second—in particular radially exactly oppositely situated—sub-coil pair 17. For this purpose, proceeding from the terminal plug 54 extending in the axial direction 3, a first branch 90 and a second branch 91 are arranged so as to be angled in the circumferential direction 2. The two branches 90, 91 together form approximately a semicircle and extend along the ring-shaped plastics body 62, wherein said branches, at their ends averted from the terminal plug 54, have fastening sections 60 for the electrical contacting with the connecting wires 30, 31 of the sub-coils 18. The first branch 90 of a first conductor element 58 is arranged radially within the second branch 91 of a second conductor element 58. The fastening section 60 of the first, inner branch 90 therefore crosses the second, outer branch 91 of the second conductor element 58 in the radial direction 4 without making contact therewith. Here, the radially inner branches 90 are arranged on an axially higher path 76 than the radially outer branches 91, which are arranged on an axially lower-lying path 77 of the plastics body 62. The conductor elements 58, which are in the form of sheet-metal strips, bear areally against the plastics body 62 and are connected to the latter for example by means of rivet connections 79, 81 or detent elements. For this purpose, it is for example the case that axial rivet pins 79 are formed on the plastics body 62, which rivet pins engage into corresponding axial apertures 80 of the conductor element 58. By means of heat, in particular ultrasound, the ends of the rivet pins 79 can be deformed to form a rivet head 81, which forms a form fit with the conductor elements

58. Thus, it is for example the case that each branch 90, 91 is fastened by means of in each case two rivet heads 81 to the interconnect plate 52, as can be seen particularly clearly in FIG. 8. On the plastics body 62, there are again integrally formed in unipartite fashion holding elements 63 which extend away from the stator body 34 in the axial direction 3 and receive the terminal plugs 54. The terminal plugs 54 are for example likewise formed, as in FIG. 5, as insulation-displacement connections 55 which, at their free axial end 68, have a notch 69 into which a wire or a clamping element of the corresponding connecting plug 56 of the customer can be inserted. In this embodiment, the holding elements 63 are of two-part form. A radially inner axial projection 92 forms a first guide surface 74 in a first circumferential direction 2, and a radially outer axial projection 93 forms the second guide surface 75 for the opposite circumferential direction 2. The two axial projections 92, 93 are arranged offset in the circumferential direction 2, such that the terminal plug 52 extends in the axial direction 3 between the guide surfaces 74, 75 of said axial projections. The axial projections 92, 93 have in each case one support surface 95 with respect to the radial direction 4, against which the terminal plug 52 is radially supported. For this purpose, the axial projections 92, 93 have for example an L-shaped or U-shaped cross section 96 transversely with respect to the axial direction 3. With respect to the axial direction 3, the radially extending transverse web 70 is supported on axial stops 72 of the holding element 63. The axial projections 92, 93 are offset in the radial direction 4 to such an extent that they do not overlap in the radial direction 4. In this way, openings 98 are formed in the holding element 63 in each case in both circumferential directions 2, from which openings the two branches 90, 91 emerge from the holding element 63 in opposite circumferential directions 2. In order that the conductor elements 58 can be installed axially into the holding elements 63, the openings 98 are upwardly open in the axial direction 3. The angled portions 100 of the branches 90, 91 to the terminal plugs 54 are arranged radially adjacent to one another and in axially different planes, in order that the branches 90, 91 can extend on the axially different paths 76, 77 of the plastics body 62.

Figure 8:
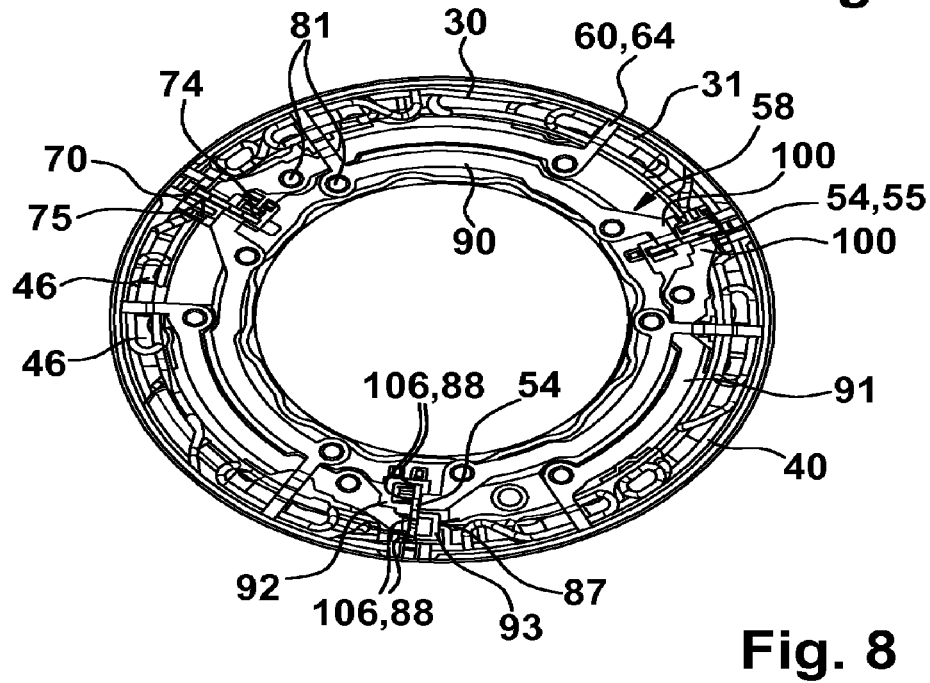

It can be seen from FIG. 8 that the branches 90, 91 are arranged radially in the region of the stator teeth 14 and radially within the guide elements 44 of the insulating lamination 40. The three holding elements 63 are arranged so as to be uniformly distributed in the circumferential direction 2 at intervals of approximately 120°. Again, one holding element 63 has, as a rotation prevention means, a relatively large width 85 in the circumferential direction 2. For this purpose, the two axial projections 92, 93 are of U-shaped form, such that their free limbs 87 point toward one another in the circumferential direction 2. The face surfaces 88 of the free limbs 87 in this case form guide surfaces 106 in the circumferential direction 2 (which correspond to the first and second guide surfaces 74, 75) between which the terminal plugs 54 are arranged.

Figure 9:
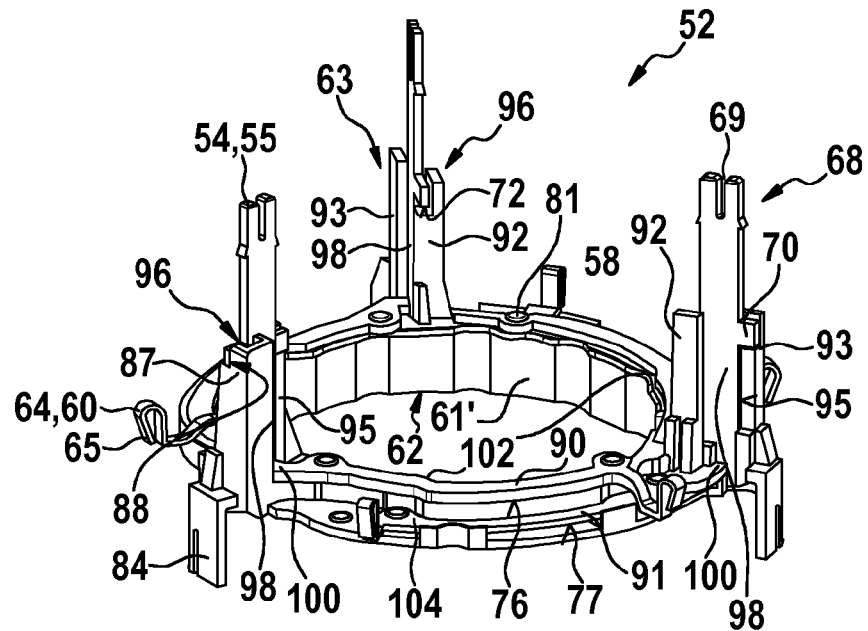
FIG. 9 shows the interconnect plate as per FIGS. 7 and 8 without a stator.

As can be seen in particular in FIG. 9, spacers 84 are integrally formed on the plastics body 62 in unipartite fashion with respect to the holding elements 63 and axially opposite the latter, which spacers bear axially against the stator body 34. The free ends of the fastening sections 60 are again, as in FIG. 5, in the form of loops 64 which are still open before the installation of the conductor elements 58 and, after the installation thereof, surround the connecting wires 31.

Figure 10:
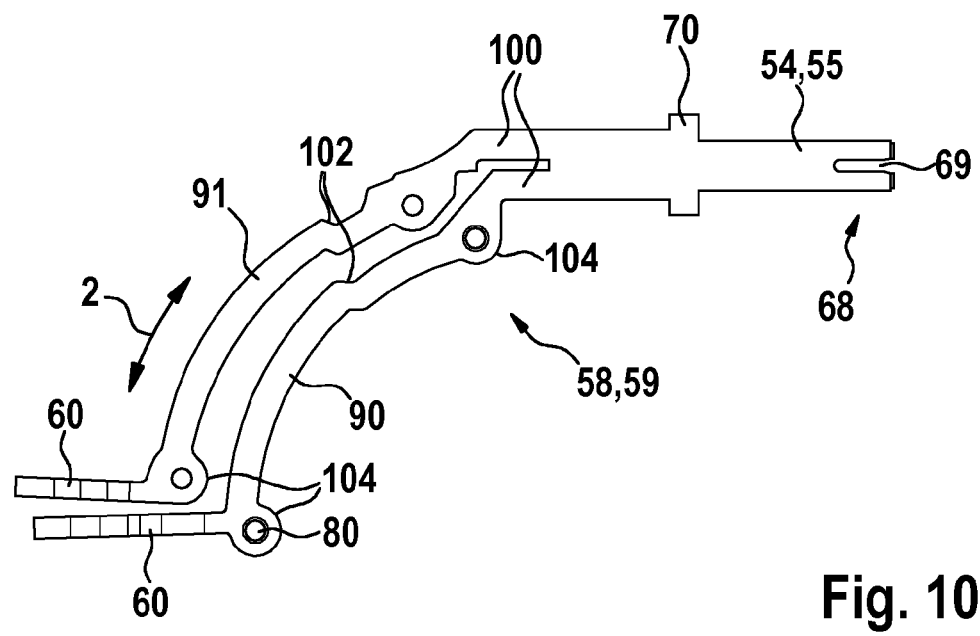
FIG. 10 shows a punched conductor element before the bending process.

FIG. 10 illustrates a conductor element 58 as a bent and punched part 59 composed of sheet metal after the punching-out process and before being bent. In this initial state, the two branches 90, 91 both point in the same circumferential direction 2, whereby sheet-metal material is saved. The two planned angled portions 100 are, in the bent state, arranged axially offset, at which angled portions the two branches 90, 91 are subsequently bent in opposite circumferential directions 2. The arcuate branches 90, 91 in this case have slight radial offsets 102 in order to receive the radial widened portions 104 at the apertures 80. The fastening sections 60 are, as per FIG. 5, pre-bent as open loops 64 and, after the mounting onto the connecting wires 30, 31, are radially pressed together to form a closed loop 64. For this purpose, it is again the case that electrodes are laid onto both radially oppositely situated surfaces of the loop 64, which electrodes are pressed together in the radial direction 4 while being fed with current in order for example to weld the loop 64 to the connecting wire 31, 30. It is thus possible for the fastening sections 60 and the electrical contacting thereof with the winding 16 to be performed in the same way as in the embodiment as per FIGS. 5 and 6. Here, depending on the sub-coil pair 17, the loop 64 surrounds only a single connecting wire 31 or simultaneously surrounds two connecting wires 31 which run parallel to one another and which are formed from the wire start 28 and the wire end 29 of a single winding strand 24, 25.

For the installation of the conductor elements 58 into the holding elements 63 of the plastics body 62, it is firstly the case that all three conductor elements 58 are arranged with their branches 90, 91 in a ring shape, such that the fastening sections 60 of the inner branches 90 radially overlap the outer branches 91. Then, all three conductor elements 58 together are simultaneously axially inserted in the axial direction 3 between the guide surfaces 74, 75, 106. This is preferably performed by means of an auxiliary tool which can simultaneously position and fixedly hold all three conductor elements 58. During the axial insertion, the rivet pins 79 of the plastics body 62 engage through the axial apertures 80 of the conductor elements 58. The ends of the rivet pins 79 can thereafter be deformed to form rivet heads 81 in order to connect the conductor elements 58 to the plastics body 62 with a form fit. Said plastic material deformation is performed for example by means of hot stamping using hot punches and/or by means of ultrasound.

The invention claimed is:

1. An interconnect plate (52) of a stator (10) of an electric machine (12), the interconnect plate being configured to connect an electrical winding (16) of the stator (10) to customer-specific connecting plugs (56) for the supply of electricity, wherein the interconnect plate (52), as a plastics body (62), has a closed ring (61) on which exactly three holding elements (63) which extend in an axial direction (3) past an edge of the closed ring are integrally formed in unipartite fashion, in each of which holding elements axial terminal plugs (54) composed of metal extend axially, wherein the axial terminal plugs (54) are each formed in unipartite fashion with conductor elements (58) which are electrically directly connectable to connecting wires (30, 31) of the electrical winding (16), wherein the conductor elements are punched out of a metal sheet, wherein the terminal plugs are bent so as to extend in the axial direction of the rotor shaft, wherein the planar metal sheet of the terminal plugs extends transversely with respect to the circumferential direction, whereas the remainder of the angled conductor elements extends areally in a plane transverse with respect to the rotor shaft in the circumferential direction, and wherein the holding elements (63) have openings (98) in a circumferential direction (2), which openings extend over the entire axial extent of said holding elements, wherein the angled conductor elements (58) are led out of the holding elements (63) through the openings (98).

2. The interconnect plate (52) as claimed in claim 1, characterized in that the conductor elements (58) are in the form of bent and punched parts (59) composed of sheet metal, axially angled projections of which are formed as insulation-displacement connections (55) which form the terminal plugs (54), wherein the sheet metal of the terminal plugs (54) extends areally in a radial direction (4), and the conductor elements (58) extend areally in a plane in a circumferential direction (2).

3. The interconnect plate (52) as claimed in claim 1, characterized in that the holding elements (63) have axial stops (72) which extend in a circumferential direction (2) and radial direction (4) in order to support transverse webs (70) of the terminal plugs (54) in the axial direction (3).

4. The interconnect plate (52) as claimed in claim 1, characterized in that in each case two terminal plugs (54) are arranged adjacently on a common holding element (63), wherein the common holding element (63) has a central web (82) which extends in a radial direction (4) and which simultaneously has a first guide surface (74) with respect to one circumferential direction (2) for one terminal plug (54) and a second guide surface (75) with respect to the opposite circumferential direction (2) for the other terminal plug (54).

5. The interconnect plate (52) as claimed in claim 1, characterized in that, proceeding from the axial terminal plug (54), the conductor element (58) extends in a first branch (90) and a second branch (91) in opposite circumferential directions (2), wherein angled angle regions (100) of the branches (90, 91) are integrally formed radially adjacent to one another.

6. The interconnect plate (52) as claimed in claim 5, characterized in that the two angled angle regions (100) are arranged axially in different planes, and the first branch and the second branch (90, 91) of the conductor element (58) lie on axially different ring-shaped paths (76, 77) of the plastics body (62).

7. The interconnect plate (52) as claimed in claim 5, characterized in that the first branch (90) of one conductor element (58) is arranged radially within and axially above the second branch (91) of another conductor element (58), and a fastening section (60) extends radially outward from the first branch (90), which fastening section crosses the second branch (91) of the other conductor element (58) without making contact therewith, in order to be contacted with the connecting wires (30, 31) arranged radially outside the first and second branches (90, 91).

8. The interconnect plate (52) as claimed in claim 1, characterized in that the holding element (63) for a single terminal plug (54) has a first guide surface (74) with respect to one circumferential direction (2) and a second guide surface (75), which is spaced apart in the circumferential direction (2), with respect to the opposite circumferential direction (2), wherein the first and second guide surfaces (74, 75) do not overlap in the radial direction (4).

9. The interconnect plate (52) as claimed in claim 1, characterized in that a single holding element (63) is formed so as to be wider in a circumferential direction (2) and/or a radial direction (4) than the other two holding elements (63), in order that a bearing cover for the rotor of the electric machine (12) with corresponding axial apertures for the holding elements (63) can be pushed onto the interconnect plate (52) in a distinct angular position.

10. The interconnect plate (52) as claimed in claim 1, characterized in that a spacer (84) is integrally formed in unipartite fashion on the plastics body (62) axially opposite the holding element (63) and at a radially outer edge, by means of which spacer the interconnect plate (52) can be supported axially with respect to the stator (10).

11. The interconnect plate (52) as claimed in claim 2, characterized in that the conductor elements (58) have apertures (80) in the sheet metal, which apertures are extended through by axial rivet pins (79) of the plastics body (62) for the fastening thereof, the free ends of which rivet pins are deformed to form rivet heads (81).

12. A stator (10) having an interconnect plate (52) as claimed in claim 1, characterized in that in each case one phase (26) of a first winding strand (24) is jointly connected, together with a corresponding phase (26) of a second winding strand (25) of the electrical winding (16), to exactly one terminal plug (54), such that a total of exactly three terminal plugs (54) are formed on the interconnect plate (52), wherein two branches (90, 91) of a single conductor element (58) make electrical contact, by means of fastening sections (60) thereof, with two radially opposite sub-coil pairs (17) at the connecting wires (30, 31) thereof.

13. An electric machine (12) having a rotor, a stator (10) and an interconnect plate (52) as claimed in claim 1, characterized in that two sub-coils (18) which are situated immediately adjacent to one another are directly connected to one another by means of a connecting wire (31), wherein the connecting wire (31) is in the form of a continuously wound winding wire (22) without interruption, wherein, on an uppermost sheet-metal lamination (36) of the stator (10), there is arranged an insulating lamella (40) which is of closed form at its outer circumference (41) and which has guide elements (44) for connecting wires (30, 31) between individual sub-coils (18), which guide elements are arranged in axially different planes, wherein all connecting wires (31) between immediately adjacent sub-coil pairs (17) of a phase (26, U, V, W) are arranged in an axially uppermost plane and are electrically connected to fastening sections (60) of the conductor elements (58).

14. A method for producing an interconnect plate (52) as claimed in claim 1, wherein, proceeding from the axial terminal plug (54), the conductor element (58) extends in a first branch (90) and a second branch (91) in opposite circumferential directions (2), the method comprising first manufacturing, by means of injection molding, the ring-shaped plastics body (62) with the three holding elements (63) integrally formed thereon in unipartite fashion, and subsequently, axially inserting the three identical terminal plugs (54) with the angled conductor elements (58) thereon along first and second guide surfaces (74, 75, 106) into the holding elements (63), such that fastening sections (60) of the first branches (90) radially cross the second branches (91) of the conductor elements (58).

15. The interconnect plate (52) as claimed in claim 1, characterized in that the conductor elements (58) are in the form of bent and punched parts (59) composed of sheet metal, axially angled projections of which are formed as insulation-displacement connections (55) which form the terminal plugs (54), wherein the sheet metal of the terminal plugs (54) extends areally in a radial direction (4), and the conductor elements (58) extend areally in a plane in a circumferential direction (2), wherein the holding elements (63) have first and second guide surfaces (74, 75) which extend in the axial direction (3) and radial direction (4) in order to support the terminal plugs (54) in the circumferential direction (2).

16. The interconnect plate (52) as claimed in claim 1, characterized in that the holding elements (63) have axial stops (72) which extend in a circumferential direction (2) and radial direction (4) in order to support transverse webs (70) of the terminal plugs (54) in the axial direction (3) during plugging-in of the corresponding connecting plugs (56).

17. The interconnect plate (52) as claimed in claim 1, characterized in that in each case two terminal plugs (54) are arranged adjacently on a common holding element (63), wherein the common holding element (63) has a central web (82) which extends in a radial direction (4) and which simultaneously has a first guide surface (74) with respect to one circumferential direction (2) for one terminal plug (54) and a second guide surface (75) with respect to the opposite circumferential direction (2) for the other terminal plug (54), wherein all six terminal plugs (54) are in each case connected to a different phase (26) of the electrical winding (16).

18. The interconnect plate (52) as claimed in claim 1, characterized in that a single holding element (63) is formed so as to be wider in a circumferential direction (2) and/or a radial direction (4) than the other two holding elements (63), in order that a bearing cover for the rotor of the electric machine (12) with corresponding axial apertures for the holding elements (63) can be pushed onto the interconnect plate (52) in a distinct angular position, wherein the single holding element (63) of relatively wide form has two U-shaped axial projections (92, 93) which are situated opposite in the circumferential direction (2) and are arranged radially offset with respect to one another, and the free limbs (87), which point toward one another in the circumferential direction (2), of said axial projections each have face surfaces (88) which form the first and second guide surfaces (74, 75, 106) for a single terminal plug (54).

19. The interconnect plate (52) as claimed in claim 1, characterized in that a spacer (84) is integrally formed in unipartite fashion on the plastics body (62) axially opposite the holding element (63) and at a radially outer edge, by means of which spacer the interconnect plate (52) can be supported axially with respect to the stator (10) directly on the axially outermost sheet-metal lamination (36, 39) thereof.

20. The interconnect plate (52) as claimed in claim 2, characterized in that the conductor elements (58) have apertures (80), which are closed over their circumference, in the sheet metal, which apertures are extended through by axial rivet pins (79) of the plastics body (62) for the fastening thereof, the free ends of which rivet pins are deformed to form rivet heads (81) by means of hot stamping.

21. The method as claimed in claim 14, wherein the three identical terminal plugs (54) are axially inserted simultaneously along the first and second guide surfaces (74, 75, 106) into the holding elements (63).

22. An interconnect plate (52) of a stator (10) of an electric machine (12), the interconnect plate being configured to connect an electrical winding (16) of the stator (10) to customer-specific connecting plugs (56) for the supply of electricity, wherein the interconnect plate (52), as a plastics body (62), has a closed ring (61) on which exactly three holding elements (63) which extend in an axial direction (3) are integrally formed in unipartite fashion, in each of which holding elements axial terminal plugs (54) composed of metal extend axially, wherein the axial terminal plugs (54) are each formed in unipartite fashion with conductor elements (58) which are electrically directly connectable to connecting wires (30, 31) of the electrical winding (16), characterized in that in each case two terminal plugs (54) are arranged adjacently on a common holding element (63), wherein the common holding element (63) has a central web (82) which extends in a radial direction (4) and which simultaneously has a first guide surface (74) with respect to one circumferential direction (2) for one terminal plug (54) and a second guide surface (75) with respect to the opposite circumferential direction (2) for the other terminal plug (54).

23. An interconnect plate (52) of a stator (10) of an electric machine (12), the interconnect plate being configured to connect an electrical winding (16) of the stator (10) to customer-specific connecting plugs (56) for the supply of electricity, wherein the interconnect plate (52), as a plastics body (62), has a closed ring (61) on which exactly three holding elements (63) which extend in an axial direction (3) are integrally formed in unipartite fashion, in each of which holding elements axial terminal plugs (54) composed of metal extend axially, wherein the axial terminal plugs (54) are each formed in unipartite fashion with conductor elements (58) which are electrically directly connectable to connecting wires (30, 31) of the electrical winding (16), characterized in that, proceeding from the axial terminal plug (54), the conductor element (58) extends in a first branch (90) and a second branch (91) in opposite circumferential directions (2), wherein angled angle regions (100) of the branches (90, 91) are integrally formed radially adjacent to one another, and characterized in that the two angled angle regions (100) are arranged axially in different planes, and the first branch and the second branch (90, 91) of the conductor element (58) lie on axially different ring-shaped paths (76, 77) of the plastics body (62).

24. An interconnect plate (52) of a stator (10) of an electric machine (12), the interconnect plate being configured to connect an electrical winding (16) of the stator (10) to customer-specific connecting plugs (56) for the supply of electricity, wherein the interconnect plate (52), as a plastics body (62), has a closed ring (61) on which exactly three holding elements (63) which extend in an axial direction (3) are integrally formed in unipartite fashion, in each of which holding elements axial terminal plugs (54) composed of metal extend axially, wherein the axial terminal plugs (54) are each formed in unipartite fashion with conductor elements (58) which are electrically directly connectable to connecting wires (30, 31) of the electrical winding (16), characterized in that the holding element (63) for a single terminal plug (54) has a first guide surface (74) with respect to one circumferential direction (2) and a second guide surface (75), which is spaced apart in the circumferential direction (2), with respect to the opposite circumferential direction (2), wherein the first and second guide surfaces (74, 75) do not overlap in the radial direction (4).

25. An interconnect plate (52) of a stator (10) of an electric machine (12), the interconnect plate being configured to connect an electrical winding (16) of the stator (10) to customer-specific connecting plugs (56) for the supply of electricity, wherein the interconnect plate (52), as a plastics body (62), has a closed ring (61) on which exactly three holding elements (63) which extend in an axial direction (3) are integrally formed in unipartite fashion, in each of which holding elements axial terminal plugs (54) composed of metal extend axially, wherein the axial terminal plugs (54) are each formed in unipartite fashion with conductor elements (58) which are electrically directly connectable to connecting wires (30, 31) of the electrical winding (16), characterized in that the conductor elements (58) are in the form of bent and punched parts (59) composed of sheet metal, axially angled projections of which are formed as insulation-displacement connections (55) which form the terminal plugs (54), wherein the sheet metal of the terminal plugs (54) extends areally in a radial direction (4), and the conductor elements (58) extend areally in a plane in a circumferential direction (2), and characterized in that the conductor elements (58) have apertures (80) in the sheet metal, which apertures are extended through by axial rivet pins (79) of the plastics body (62) for the fastening thereof, the free ends of which rivet pins are deformed to form rivet heads (81).

\* \* \* \* \*